United States Patent
Manabe et al.

(10) Patent No.: US 6,761,939 B2
(45) Date of Patent: Jul. 13, 2004

(54) LIQUID CRYSTALLINE MEDIUM AND LIQUID CRYSTAL DISPLAY

(75) Inventors: Atsutaka Manabe, Wilmshausen/Bensheim (DE); Elena Kress, Moemlingen (DE); Volker Reiffenrath, Rossdorf (DE)

(73) Assignee: Merck Patent GmbH, Darmstadt (DE)

( * ) Notice: Subject to any disclaimer, the term of this patent is extended or adjusted under 35 U.S.C. 154(b) by 63 days.

(21) Appl. No.: 10/277,972

(22) Filed: Oct. 23, 2002

(65) Prior Publication Data

US 2003/0155552 A1 Aug. 21, 2003

(30) Foreign Application Priority Data

Oct. 23, 2001 (EP) .............................. 01125182

(51) Int. Cl.$^7$ ........................ C09K 19/12; C09K 19/30; C09K 19/34
(52) U.S. Cl. ............. 428/1.1; 252/299.61; 252/299.63; 252/299.66
(58) Field of Search ...................... 428/1.1; 252/299.61, 252/299.63, 299.66

(56) References Cited

U.S. PATENT DOCUMENTS

| | | | |
|---|---|---|---|
| 5,328,644 A | | 7/1994 | Goulding et al. |
| 5,948,319 A | * | 9/1999 | Tanaka et al. ......... 252/299.66 |
| 6,569,505 B2 | * | 5/2003 | Poetsch et al. .............. 428/1.1 |
| 6,635,190 B2 | * | 10/2003 | Heckmeier et al. .... 252/299.63 |
| 6,692,796 B2 | * | 2/2004 | Ichinose et al. ............. 428/1.1 |

FOREIGN PATENT DOCUMENTS

| | | |
|---|---|---|
| DE | 40 00 451 | 7/1991 |
| DE | 199 19 348 | 11/1999 |
| JP | 6-264059 | 6/1994 |
| WO | WO 91/05029 | 4/1991 |

* cited by examiner

*Primary Examiner*—Shean C. Wu
(74) *Attorney, Agent, or Firm*—Millen, White, Zelano & Branigan, P.C.

(57) ABSTRACT

Liquid crystalline media comprising a dielectrically positive component, component A, containing dielectrically positive compounds, comprising one or more compounds of formula I and one or more compounds of formula II

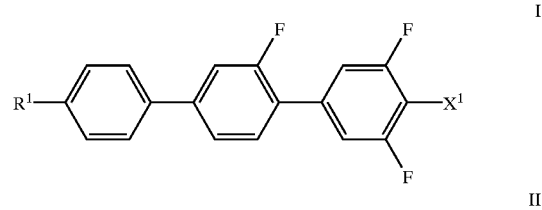

and one or more dielectrically neutral compounds of formula IVb

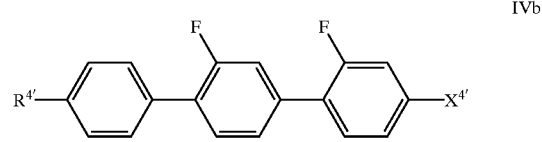

wherein the parameters have the meaning defined therein; and wherein two of the 6-membered rings in formula IVb may optionally be linked by an group selected from —CH$_2$—CH$_2$—, —CF$_2$—CF$_2$—, —CF$_2$—O—, —O—CF$_2$— and —CO—O— are sutiable for use in liquid crystal displays, especially active matrix displays.

13 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, especially to displays addressed by an active matrix (AMDs) and in particular to displays addressed by thin film transistors (TFTs), especially for projection type displays. Preferably, the TFTs are prepared on silicon (LCoS). The inventive media are also well suited for displays of the optically compensated bend (OCB) mode.

PROBLEM TO BE SOLVED AND STATE OF THE ART

Liquid Crystal Displays (LCDs) are widely used to display information. Electro-optical modes employed are, e.g., the twisted nematic (TN)-, the super twisted nematic (STN)-, the optically compensated bend (OCB)- and the electrically controlled birefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer, like, e.g., the In-Plane Switching mode (as disclosed, e.g., in DE 40 00 451 and EP 0 588 568). Especially this electrooptical mode is used for LCDs for modern desk top monitors.

The liquid crystals according to the present invention are preferably used in AM addressed displays in particular in TFTs displays, especially for projection type displays. Preferably the TFTs are prepared on silicon (LCoS). The inventive media are also well suited for displays of the OCB mode.

For these displays new liquid crystalline media with improved properties are required. Especially the birefingence ($\Delta n$) should be sufficiently high. Further, the dielectric anisotropy ($\Delta \epsilon$) should be high enough to allow a reasonably low operation voltage. Preferably, $\Delta \epsilon$ should be higher than 7 and very preferably be higher than 9, or even higher than 10, but preferably not higher than 19 and in particular not higher than 15. Otherwise, the resistivity of the mixtures tends to become inacceptably low for most TN-AMDs. Besides this parameter, the media have to exhibit a suitably wide range of the nematic phase, a rather small rotational viscosity and, as mentioned above, an at least moderately high specific resistivity.

The displays according to the present invention are preferably addressed by an active matrix (active matrix LCDs, short AMDs), preferably by a matrix of thin film transistors (TFTs). However, the inventive liquid crystals can also beneficiously be used in displays with other known addressing means.

There are various different display modes using composite systems of liquid crystal materials of low molecular weight together with polymeric materials such as, e.g., polymer dispersed liquid crystal (PDLC)-, nematic curvilinearly aligned phase (NCAP)- and polymer network (PN)- systems, as disclosed, for example, in WO 91/05 029 or axially symmetric microdomain (ASM) systems and others. In contrast to these, the modes especially preferred according to the instant invention are using the liquid crystal medium as such, oriented on surfaces. These surfaces typically are pretreated to achieve uniform alignment of the liquid crystal material. The display modes according to the instant invention preferably use an electrical field substantially perpendicular to the composite layer.

LCDs are used for direct view displays, as well as for projection type displays.

Liquid crystal compositions with a high value of the birefringence suitable for LCDs and especially for AMD displays are known, e.g., from U.S. Pat. No. 5,328,644, JP 06-264 059 (A) and DE 199 19 348. These compositions, however, do all have significant drawbacks. Most of them have, amongst other deficiencies, too low values of the birefringence and/or require operation voltages which are too high. Many of them also have too low resistivities, especially after exposure to elevated temperature and/or intense actinic radiation, in particular strong visible light and/or UV radiation. Many of the media of the prior art do further lead to unfavourably long response times.

Thus, there is a significant need for liquid crystalline media with suitable properties for practical applications such as a wide nematic phase range, low viscosities, a high $\Delta \epsilon$, a sufficiently high resistivity and, in particular, an appropriately high optical anisotropy $\Delta n$, according to the display mode used.

PRESENT INVENTION

Surprisingly, it now has been found that liquid crystalline media with a suitably high $\Delta \epsilon$, a suitable phase range, $\Delta n$ and a sufficiently high resistivity can be realised, which do not exhibit the drawbacks of the materials of the prior art or at least do exhibit them to a significantly lesser degree.

These improved liquid crystalline media according to the instant application comprise at least the following components:

a dielectrically positive component, component A, consisting of dielectrically positive compounds, comprising one or more compounds of formula I, one or more compounds of formula II and optionally one or more compounds, preferably selected from the group of compounds of formulae of formula III, IVa and V and optionally further dielectrically positive compounds

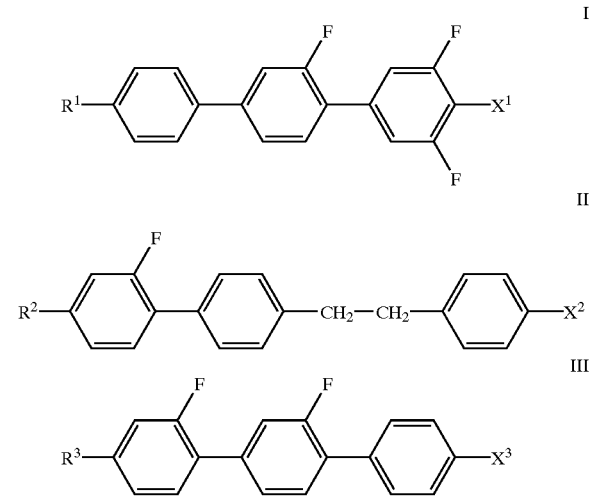

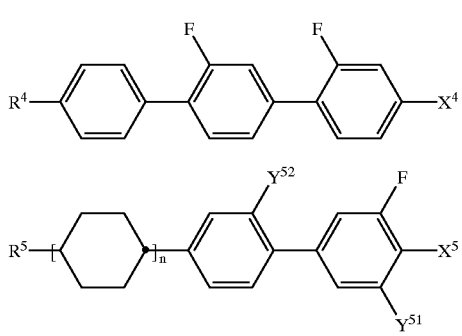

wherein
- $R^1$, $R^2$, $R^3$, $R^4$ and $R^5$ independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
- $X^1$, $X^2$, $X^3$ and $X^5$ independently of each other, are F, Cl or fluorinated alkyl or fluorinated alkoxy, each with 1 to 4 C-atoms, preferably
  - $X^1$ and $X^5$ are, independently of each other, F or Cl, most preferably F and
  - $X^2$ and $X^3$ are, independently of each other, F or Cl, most preferably Cl,
- $X^4$ is fluorinated alkyl or fluorinated alkoxy, each with 1 to 4 C-atoms, preferably $OCF_3$ or $OCF_2H$,
- $Y^{51}$ and $Y^{52}$ are, independently of each other, H or F and
- n is 0, 1 or 2, preferably 1 or 2, most preferably 2,
- wherein, optionally, two of the 6-membered rings in formulae I, and III to V may be linked by a group selected from
  - $-CH_2-CH_2-$, $-CF_2-CF_2-$, $-CF_2-O-$, $-O-CF_2-$ and $-CO-O-$, preferably $-CH_2-CH_2-$ and $-CF_2-O-$, most preferably $-CH_2-CH_2-$,
- a dielectrically neutral component, component B, consisting of dielectrically neutral compounds, comprising one or more compounds of formula IVb

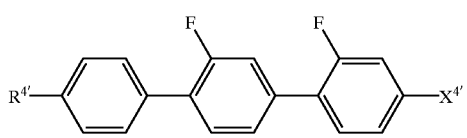

wherein
- $R^{4'}$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
- $X^{4'}$ is F or Cl, preferably F,
- wherein, optionally, two of the 6-membered rings may be linked by a group selected from
  - $-CH_2-CH_2-$, $-CF_2-CF_2-$, $-CF_2-O-$, $-O-CF_2-$ and $-CO-O-$, preferably $-CH_2-CH_2-$ and $-CF_2-O-$, most preferably $-CH_2-CH_2-$, and
- optionally, a dielectrically negative component, component C, consisting of dielectrically negative compounds.

Preferably, the dielectrically positive component, component A comprises one or more compounds each of formulae I, II IVb and one or more compounds selected from the group of compounds each of formulae III, IVa and V and in particular one or more compounds each of formulae III and V.

Further, the dielectrically positive component, component A, optionally comprises one or more compounds of formula VI

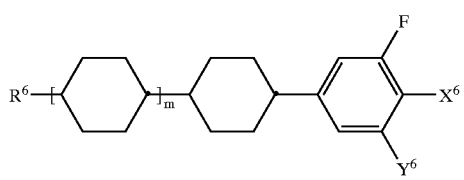

wherein
- $R^6$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
- $X^6$ is F, Cl or fluorinated alkyl or fluorinated alkoxy, each with 1 to 4 C-atoms, preferably F or Cl, most preferably F,
- $Y^6$ is H or F and
- m is 0, 1 or 2, preferably 1 or 2 and most preferably 1,
- wherein, optionally, two of the 6-membered rings may be linked by an group selected from
  - $-CH_2-CH_2-$, $-CF_2-CF_2-$, $-CF_2-O-$, $-O-CF_2-$ and $-CO-O-$, preferably $-CH_2-CH_2-$ and $-CF_2-O-$, most preferably $-CH_2-CH_2-$ The liqiud crystal mixtures according to the present invention comprise a dielectrically neutral component, component B. This component has a dielectrical anisotropy in the range from −1.5 to +3. Preferably, it contains essentially, and especially preferably, entirely dielectrically positive compounds. Preferably, this component, besides one or more compounds of formula IVb, comprises one or more dielectrically neutral compounds of formula VII

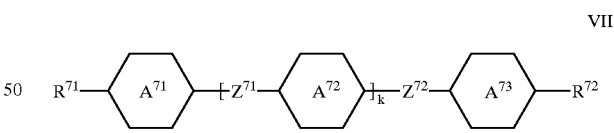

wherein
- $R^{71}$ and $R^{72}$, independently of each other, have the meaning given for $R^1$ under formula I above,

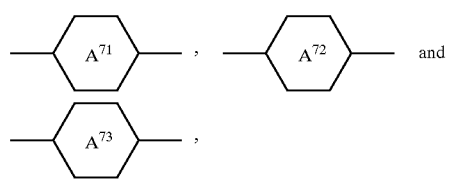

independently of each other, and in case

is present twice, also these, independently of each other, are

 , 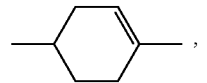 ,

 , 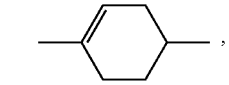 ,

 , 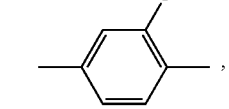 ,

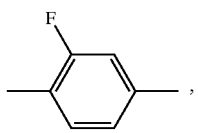 , 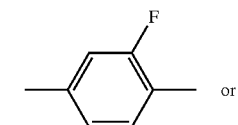 or

preferably at least one of

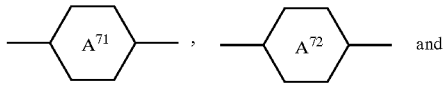

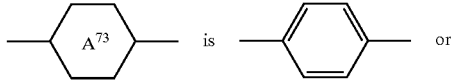

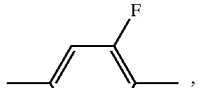 , and preferably at least one of

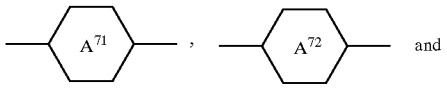

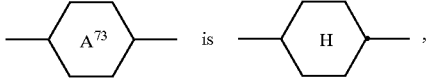 , $Z^{71}$ and $Z^{72}$ are, independently of each other, and in case $Z^{71}$ is present twice, also these independently of each other, —CH$_2$CH$_2$—, —COO—, trans-CH=CH—, trans-CF=CF—, —CH$_2$O—, —CF$_2$O— or a single bond, preferably at least one of them is a single bond and most preferably all are single bonds, and k is 0, 1 or 2, preferably 1 or 2 from which the compounds of formula IVb are excluded.

Optionally, the liqiud crystral mixtures according to the present invention comprise a dilectrically negative, component C. This component has a dielectrical anisotropy below −1.5, and consists of dielectrically negative compounds and comprises compounds of formula VIII

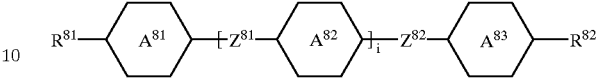

VIII wherein $R^{81}$ and $R^{82}$ independently of each other have the meaning given for $R^1$ under formula I above,

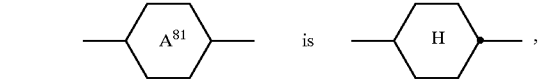 is 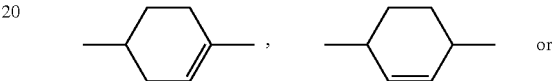 ,

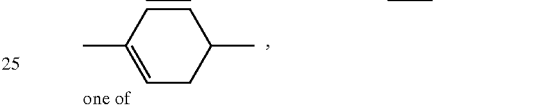 or

 , one of

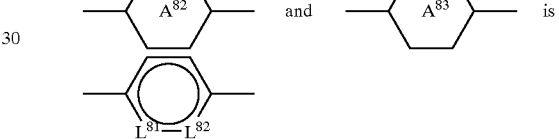

and the other one has one of the meanings given for

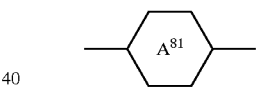

or is

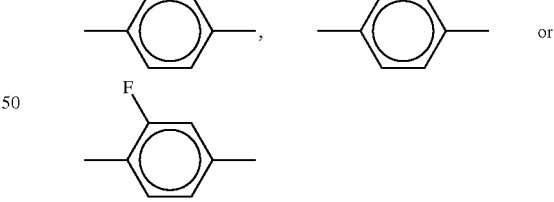

$L^{81}$ and $L^{82}$ are, independently of each other, =C(—F)— or =N—, preferably at least one one of them is =C(—F)— and most preferably both of them are =C(—F)— and $Z^{81}$ and $Z^{82}$ are, independently of each other, —CH$_2$CH$_2$—, —COO—, trans-CH=CH—, trans-CF=CF—, —CH$_2$O—, —CF$_2$O— or a single bond, preferably at least one of them is a single bond and most preferably all are a single bond, and i is 0 or 1.

Preferably, the liquid crystalline media according to the instant invention contain a component A comprising, preferably predominantly consisting of and most preferably entirely consisting of compounds selected from formulae I to VIII.

Comprising in this application means in the context of compositions that the entity referred to, e.g., the medium or the component, contains the component or components or the compound or compounds in question, preferably in a total concentration of 10% or more, and most preferably of 20% or more.

Predominantly consisting, in this context, means that the entity referred to contains 80% or more, preferably 90% or more, and most preferably 95% or more of the component or components or of the compound or compounds in question.

Entirely consisting, in this context, means that the entity referred to contains 98% or more, preferably 99% or more, and most preferably 100.0% of the component or components or of the compound or compounds in question.

Preferably, component A comprises one or more compounds of formula I, wherein $X^1$ is F. Preferably, component A further comprises one or more compounds of formula II, wherein $X^2$ is Cl. Also, preferably component A comprises one or more compounds of formula III, wherein $X^3$ is Cl and/or one or more compounds of formula IVa wherein $X^4$ is F.

The compounds of formula V are preferably selected from the group of sub-formulae V-1 to V-12

V-1
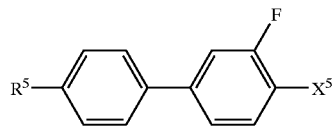

V-2
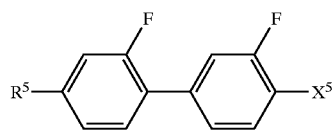

V-3
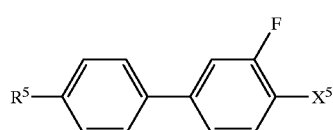

V-4
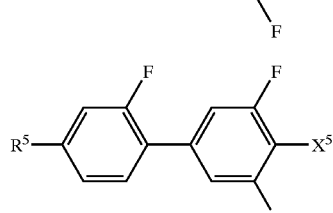

V-5
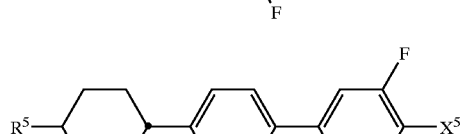

V-6
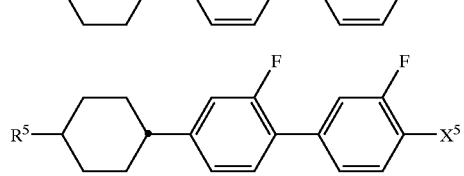

V-7
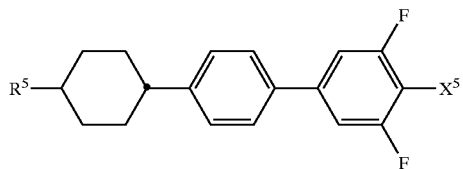

V-8
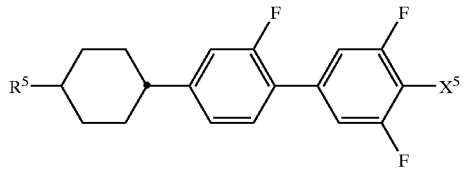

V-9
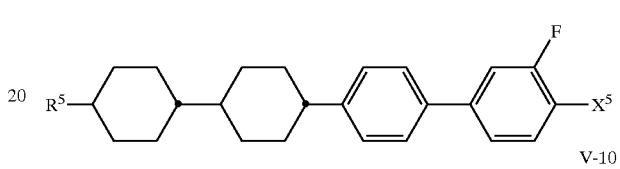

V-10
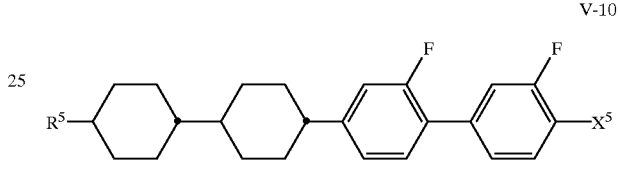

V-11
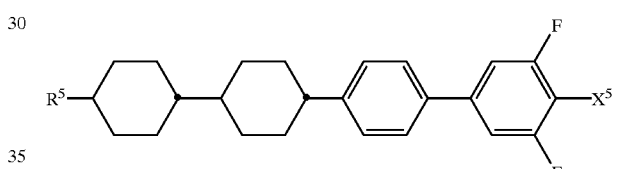

V-12
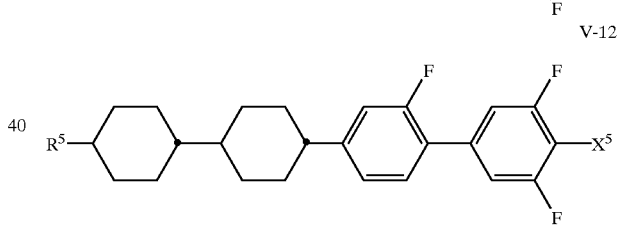

wherein $R^5$ and $X^5$ have the respective meanings given under formula V above and preferably $R^5$ is n-alkyl with 1 to 5 C-atoms and $X^5$ is F, Cl, —$CF_3$ or —$OCF_3$, most preferably F.

Especially preferred are the media which contain compounds of formula V selected from the group of sub-formulae V-5 to V-12, most preferably V-5 to V-8 and V-12 and in particular V-5, V-7, V-8 and V-12.

The compounds of formula VI are preferably selected from the group of sub-formulae VI-1 to VI-18

VI-1
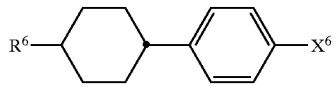

wherein

R⁶ and X⁶ have the respective meanings given under formula VI above and preferably R⁶ is n-alkyl with 1 to 5 C-atoms or alkenyl with 2 to 5 C-atoms and X⁶ is F, Cl, —CF₃ or —OCF₃, preferably F or Cl and most preferably F.

Most preferably the medium contains compounds of formula VI selected from the group of sub-formulae VI-7 to VI-15 and in particular VI-8 and VI-9.

Especially preferred are further media comprising compounds selected from the group of formulae VI-8, VI-11 and VI-14 and/or VI-9, VI-12 and VI-15, in particular with R⁶ being alkenyl, especially vinyl.

In a preferred embodiment the liquid crystalline media according to the instant invention contains a component B comprising, preferably predominantly consisting of, and most preferably entirely consisting of compounds selected from the group of formulae IVb and VII.

In a further preferred embodiment the liquid crystal medium contains a liquid crystal component C, which is preferably predominantly consisting of, and most preferably entirely consisting of compounds of formula VIII.

This component C may be present, and preferably is present, besides components A and B.

The compounds of formula VII are preferably selected from the group of sub-formulae VII-1 to VII-10

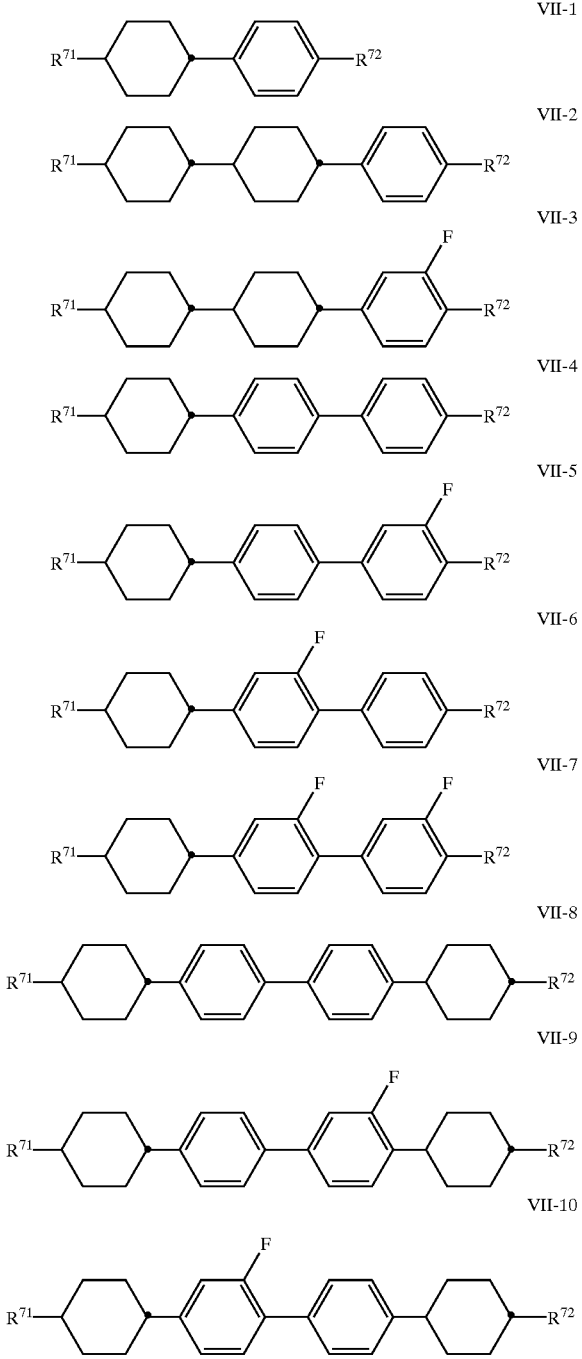

wherein
R$^{71}$ and R$^{72}$ have the meaning given under Formula VII above.

Most preferably the medium contains compounds of formula VII selected from the group of sub-formulae VII-1, VII-2, VII-4, VII-6, VII-8 and VII-10, and in particular VII-4, VII-6, VII-8 and VII-10.

Especially preferred are further media comprising compounds selected from the group of formula VII-3 and in particular with R$^{72}$ being alkenyl, especially vinyl.

Also other mesogenic, as well as nonmesogenic, compounds, which are not explicitly mentioned above, can optionally and beneficiously be used in the media according to the instant invention. Such compounds are known to the expert in the field.

In a preferred embodiment the medium comprises one or more compounds of formula V-5 and/or V-7, preferably with R$^5$ being n-alkyl, preferably with 2 to 5 C-atoms.

In a further preferred embodiment, which may be identical to the one above, the medium comprises one or more compounds of formula V-8, preferably with R$^5$ being n-alkyl, preferably with 2 to 5 C-atoms.

Preferably, the medium comprises one or more compounds of formula VI-6 preferably with R$^6$ being n-alkyl, preferably with 3 to 5 C-atoms, or alkenyl, preferably vinyl, and with X$^6$ being preferably Cl or F, most preferably F.

Preferably, the medium comprises one or more compounds of formula VII-4 and/or, preferably, VII-6, preferably together with one or more compounds of formula VII-8 and/or, preferably, VII-10. In these compounds of formulae VII-4, VII-6, VII-8 and VII-10 R$^{71}$ and R$^{72}$ are preferably, independently from each other, n-alkyl, preferably with 3 to 5 C-atoms.

Component A preferably is used in a concentration from 50% to 100%, preferably from 60% to 100%, more preferably from 70% to 100% and most preferably from 80% to 100%, preferably up to to 90% of the total mixture.

Component B preferably is used in a concentration from more than 0% to 80%, preferably from more than 0% to 30%, more preferably from 2% to 20% and most preferably from 4% to 15% of the total mixture.

Component C preferably is used in a concentration from 0% to 30%, preferably from 0% to 20% and most preferably from 0% to 10% of the total mixture.

Optionally, the inventive media can comprise further liquid crystal compounds in order to adjust the physical properties. Such compounds are known to the expert. Their concentration in the media according to the instant invention is preferably 0% to 30%, more preferably 0% to 20% and most preferably 0.5% to 15%.

Preferably, the liquid crystal medium contains 50% to 100%, more preferably 70% to 100% and most preferably 80% to 100% and in particular 90% to 100% totally of components A, B and C, which contain, preferably predominantly consist of, and most preferably entirely consist of one or more of compounds of formulae I to VIII, respectively.

The liquid crystal media according to the instant invention are characterized by a clearing point of 90° C. or more, preferably of 95° C. or more and in particular of 100° C. or more.

The Δn of the liquid crystal media according to the instant invention is 0.170 or more, preferably in the range of 0.180 to 0.280, more preferably in the range of 0.190 to 0.250, most preferably in the range of 0.195 to 0.230 and in particular in the range of 0.200 to 0.225.

The Δε, at 1 kHz and 20° C., of the liquid crystal media according to the invention is 7.0 or more, preferably 9.0 or more, most preferably 10.0 or more and in particular 11.5 or more. It is, however, preferably 20.0 or less, more preferably 17.0 or less and most preferably 15.0 or less.

Preferably, the nematic phase of the inventive media extends at least from 0° C. to 90° C., more preferably at least from −20° C. to 80° C., more preferably at least from −20° C. to 90° C., most preferably at least from −30° C. to 90° C., and in particular at least from −30° C. to 100° C., wherein at least means that preferably the lower limit is under cut, wherein the upper limit is surpassed.

In the present application the term dielectrically positive compounds describes compounds with Δε>3.0, dielectrically neutral compounds are compounds with $-1.5 \leq \Delta\epsilon \leq 3.0$, and dielectrically negative compounds are compounds with $\Delta\epsilon < -1.5$. The same holds for components. $\Delta\epsilon$ is determined at 1 kHz and 20° C. The dielectrical anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%. Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties have been determined with test cells prepared at Merck KGaA, Germany. The test cells for the determination of $\Delta\epsilon$ had a cell gap of 22 μm. The electrode was a circular ITO electrode with an area of 1.13 cm² and a guard ring. The orientation layers were lecithin for homeotropic orientation ($\epsilon_{\parallel}$) and polyimide AL-1054 from Japan Synthetic Rubber for homogeneuous orientation ($\epsilon_{\perp}$). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)-mid grey ($V_{50}$)- and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 8 to 20 and most preferably of 10 to 16 compounds.

These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in projectoin type TFT displays.

The melting point T(C,N), the transition from the smectic (S) to the nematic (N) phase T(S,N) and the clearing point T (N,I) of the liquid crystals are given in degrees centigrade.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

The entire disclosure of all applications, patents and publications, cited herein and of corresponding European application No. 01125182.4, filed Oct. 23, 2001, is incorporated by reference herein.

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nF.F | $C_nH_{2n+1}$ | F | F | H |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | F | H |
| nCl.F.F | $C_nH_{2n+1}$ | Cl | F | F |
| $nCF_3$ | $C_nH_{2n+1}$ | $CF_3$ | H | H |
| $nCF_3$.F | $C_nH_{2n+1}$ | $CF_3$ | F | H |
| $nCF_3$.F.F | $C_nH_{2n+1}$ | $CF_3$ | F | F |

-continued

| Code for $R^1$, $R^2$, $L^1$, $L^2$ | $R^1$ | $R^2$ | $L^1$ | $L^2$ |
|---|---|---|---|---|
| nOCF$_3$ | $C_nH_{2n+1}$ | OCF$_3$ | H | H |
| nOCF$_3$.F | $C_nH_{2n+1}$ | OCF$_3$ | F | H |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | F | H |
| nOCF$_2$.F.F | $C_nH_{2n+1}$ | OCHF$_2$ | F | F |
| nS | $C_nH_{2n+1}$ | NCS | H | H |
| nS.F | $C_nH_{2n+1}$ | NCS | F | H |
| nS.F.F | $C_nH_{2n+1}$ | NCS | F | F |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | COOC$_m$H$_{2m+1}$ | H | H |

TABLE A

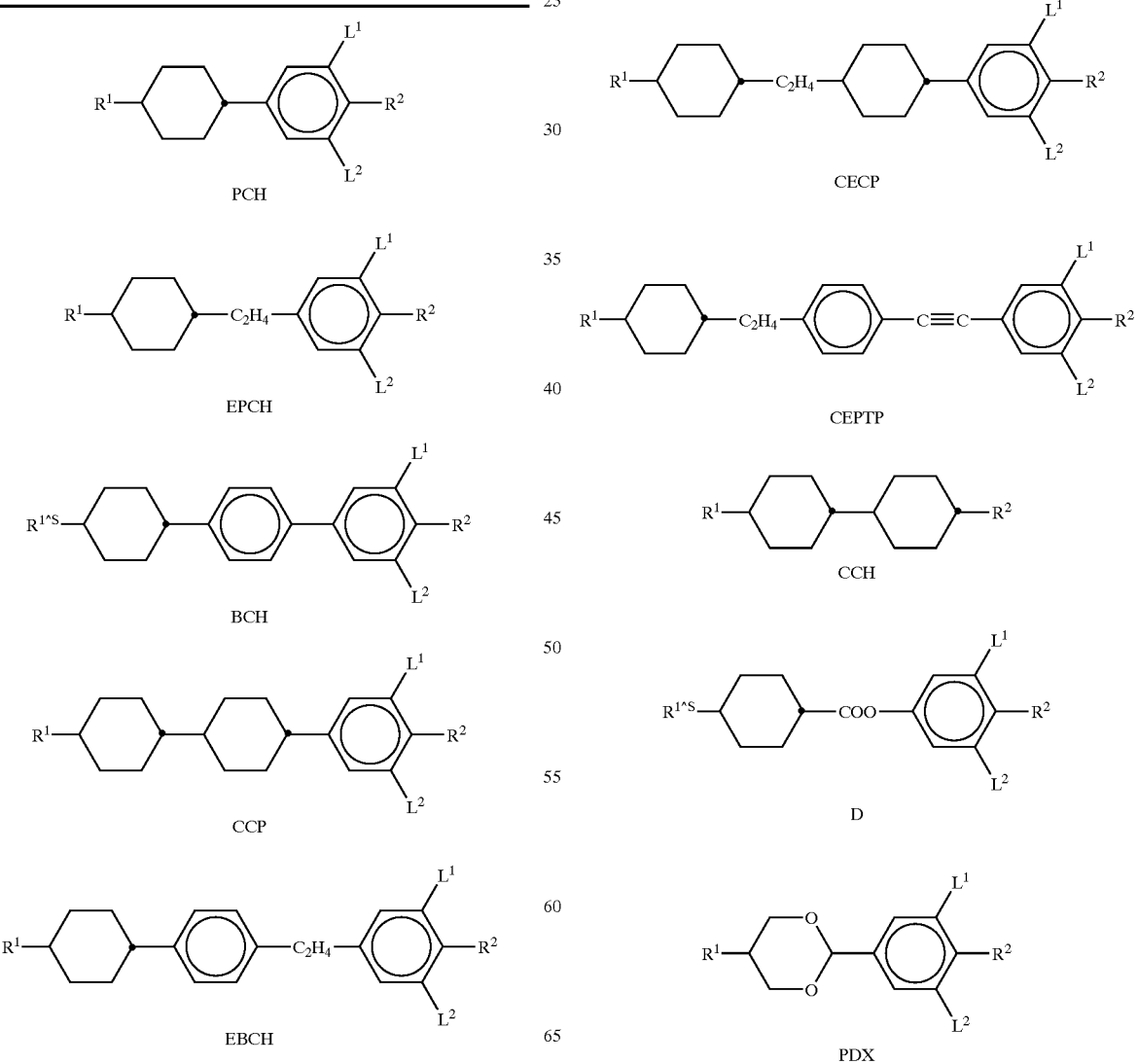

PCH

EPCH

BCH

CCP

EBCH

BECH

ECCP

CECP

CEPTP

CCH

D

PDX

TABLE A-continued
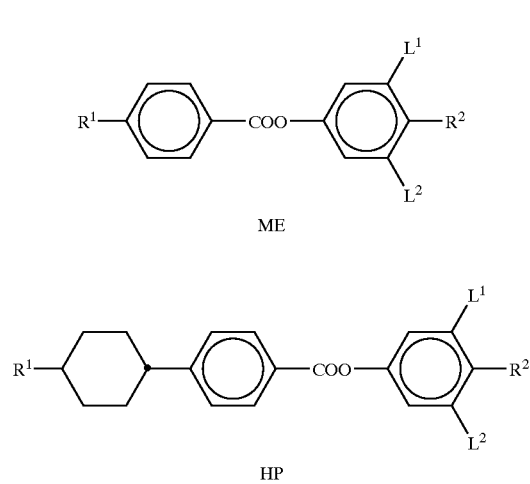
ME
HP
TABLE A-continued
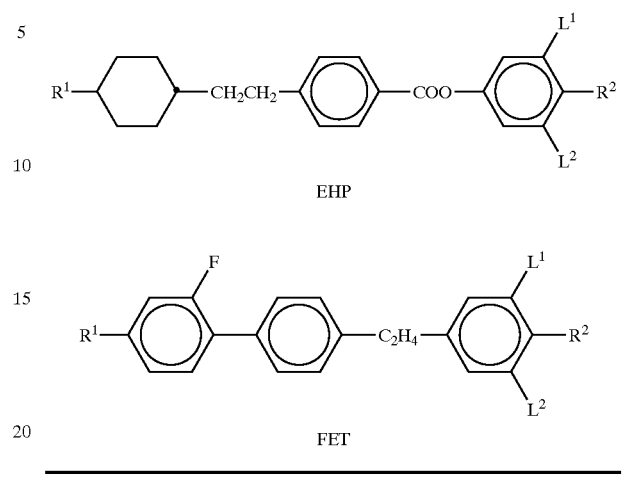
EHP
FET
TABLE B
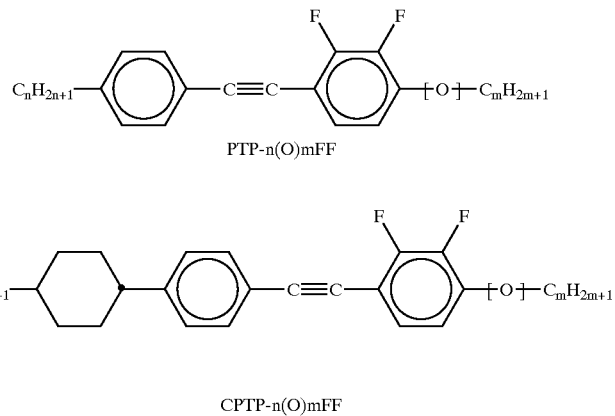
PTP-n(O)mFF
CPTP-n(O)mFF
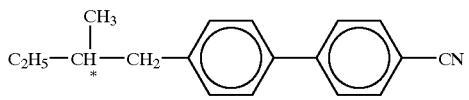
CB15
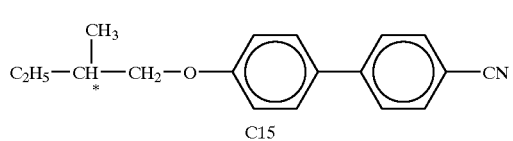
C15
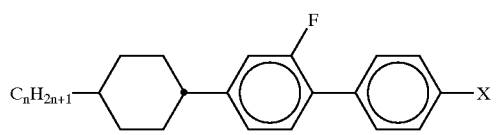

TABLE B-continued
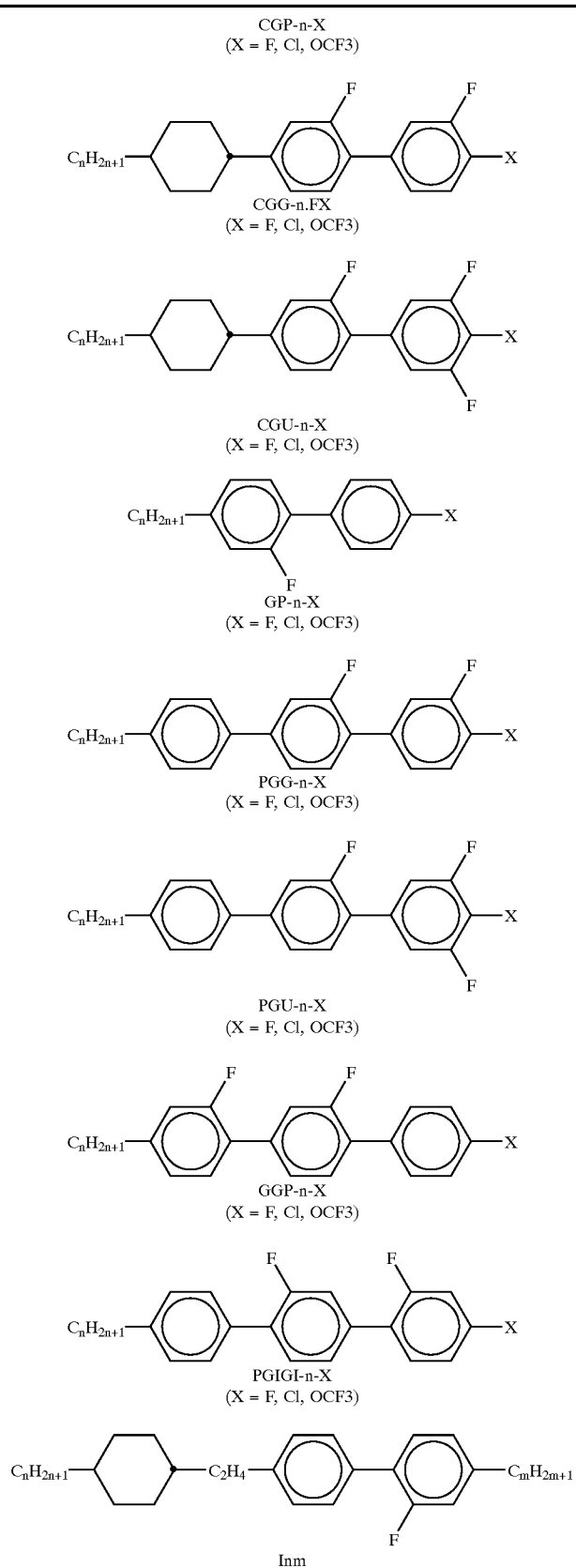

TABLE B-continued
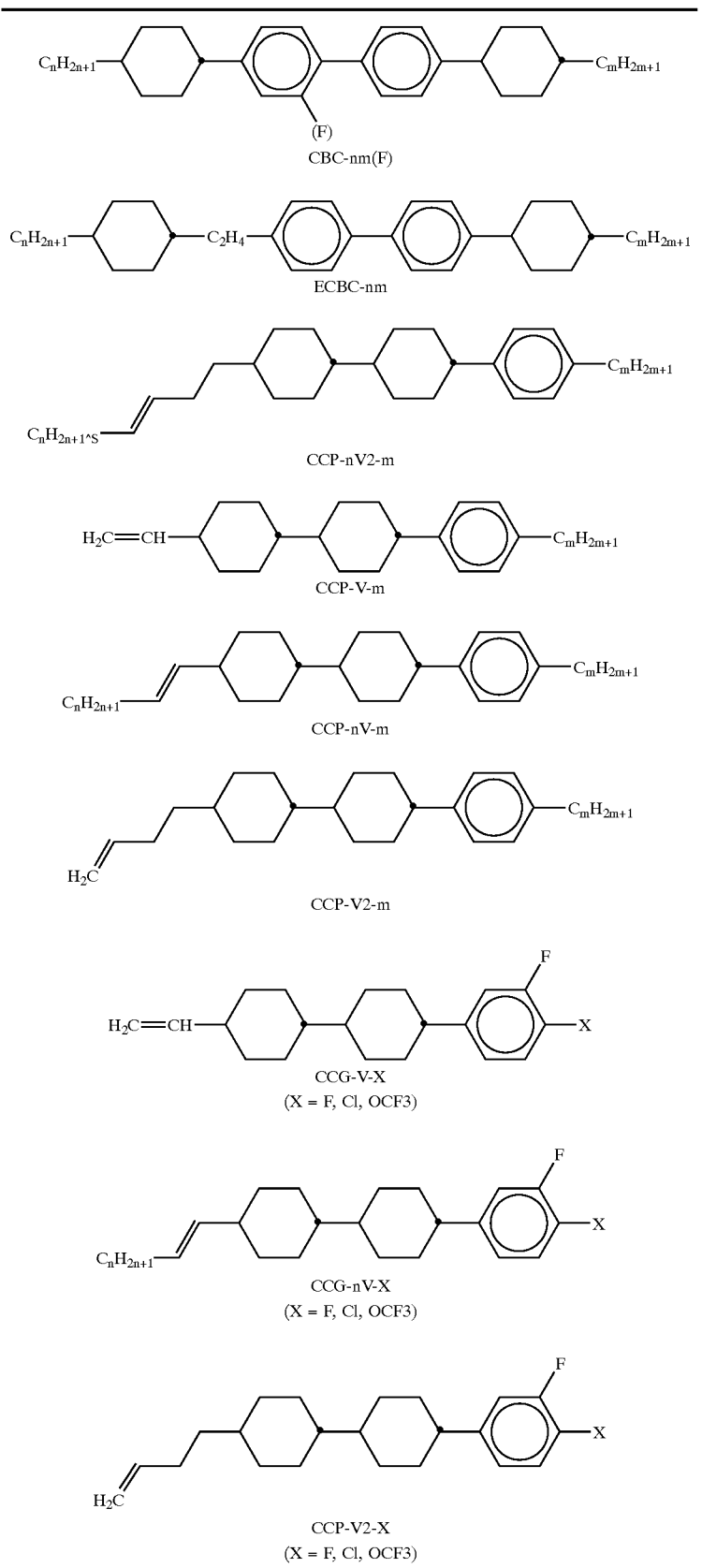

TABLE B-continued

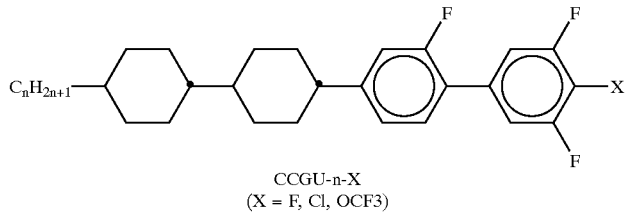

CCGU-n-X
(X = F, Cl, OCF3)

The liquid crystal media according to the instant invention do contain preferably
- seven or more, preferably eight or more compounds, preferably of different formulae, selected from the group of compounds of formulae of tables A and B and/or
- one, two or more, preferably three or more compounds, preferably of different formulae, selected from the group of compounds of formulae of table A and/or
- two, three, four or more, preferably five or more compounds, preferably of different formulae, selected from the group of compounds of formulae of table B.

EXAMPLES

The examples given in the following are illustrating the present invention without limiting it in any way.

However, they illustrate typical preferred embodiments. They show the use of typical and preferred constituents and exemplarily illustrate their concentrations. Further they show possible variations of the physical properties of the compositions, illustrating of the expert which properties can be achieved and in which ranges they can be modified. Especially the combination of the various properties which can be preferably achieved is thus well defined for the expert.

Example 1

A liquid crystal mixture is realized with the composition and properties given in the following table.

| Composition Compound | | | Physical Properties | |
|---|---|---|---|---|
| No. | Abbreviation | Conc./% | | |
| | | | $T(N,I)$ | = 102° C. |
| | | | $T(S,N)$ | = <-30° C. |
| 1 | GGP-3-CL | 9.0 | | |
| 2 | GGP-5-CL | 24.0 | $n_e$ (20° C., 589.3 nm) | = 1.7160 |
| 3 | PGIGI-3-F | 5.0 | $\Delta n$ (20° C., 589.3 nm) | = 0.2004 |
| 4 | BCH-3F.F | 3.0 | | |
| 5 | BCH-5F.F | 4.0 | $\epsilon_{\parallel}$ (20° C., 1 kHz) | = 15.7 |
| 6 | BCH-3F.F.F | 9.0 | $\Delta\epsilon$ (20° C., 1 kHz) | = 11.3 |
| 7 | BCH-5F.F.F | 10.0 | | |
| 8 | CBC-33F | 4.0 | $\gamma_1$ (20° C.) | = 338 mPa · s |
| 9 | CBC-53F | 4.0 | | |
| 10 | CCG-V-F | 7.0 | $k_1$ | = 13.8 pN |
| 11 | PGU-2-F | 6.0 | $k_3/k_1$ | = 1.07 |
| 12 | PGU-3-F | 7.0 | | |
| 13 | FET-2CL | 4.0 | | |
| 14 | FET-3CL | 4.0 | $V_{10}$ (20° C.) | = 1.17 V |
| Σ | | 100.0 | | |

This mixture has a favourably high value of $\Delta n$ and a high value of $\Delta\epsilon$ and is very well suited for displays with a low operating voltage.

Example 2

A liquid crystal mixture is realized with the composition and properties given in the following table.

| Composition Compound | | | Physical Properties | |
|---|---|---|---|---|
| No. | Abbreviation | Conc./% | | |
| | | | $T(N,I)$ | = 102° C. |
| | | | $T(S,N)$ | = <-30° C. |
| 1 | GGP-3-CL | 8.0 | | |
| 2 | GGP-5-CL | 20.0 | $n_e$ (20° C., 589.3 nm) | = 1.7161 |
| 3 | PGIGI-3-F | 4.0 | $\Delta n$ (20° C., 589.3 nm) | = 0.2013 |
| 4 | BCH-3F.F.F | 8.0 | | |
| 5 | BCH-5F.F.F | 8.0 | $\epsilon_{\parallel}$ (20° C., 1 kHz) | = 19.4 |
| 6 | CGU-3-F | 4.0 | $\Delta\epsilon$ (20° C., 1 kHz) | = 14.8 |
| 7 | CGU-5-F | 4.0 | | |
| 8 | CBC-33F | 3.0 | $\gamma_1$ (20° C.) | = 413 mPa · s |
| 9 | CBC-53F | 4.0 | | |
| 10 | CCGU-3-F | 9.0 | $k_1$ | = 14.3 pN |
| 11 | PGU-2-F | 8.0 | $k_3/k_1$ | = 1.05 |
| 12 | PGU-3-F | 8.0 | | |
| 13 | FET-2CL | 6.0 | $V_{10}$ (20° C.) | = 1.04 V |
| 14 | FET-3CL | 6.0 | | |
| Σ | | 100.0 | | |

This mixture has a favourably high value of $\Delta n$ and a high value of $\Delta\epsilon$ and an extremely good combination of these values with a very low rotational viscosity and thus is very well suited for displays with a low operating voltage.

Comparative Example

A liquid crystal mixture is realized with the composition and properties given in the following table.

| Composition Compound | | | Physical Properties | |
|---|---|---|---|---|
| No. | Abbreviation | Conc./% | | |
| | | | $T(N,I)$ | = 102° C. |
| | | | $T(S,N)$ | = <-20° C. |
| 1 | GGP-5-CL | 16.0 | | |
| 2 | GCH-2F.F | 11.0 | $n_e$ (20° C., 589.3 nm) | = 1.6692 |
| 3 | BCH-3F.F | 11.0 | $\Delta n$ (20° C., 589.3 nm) | = 0.1610 |
| 4 | BCH-5F.F | 6.0 | | |
| 5 | BCH-3F.F.F | 8.0 | $\epsilon_{\parallel}$ (20° C., 1 kHz) | = 15.3 |
| 6 | CGU-2-F | 9.0 | $\Delta\epsilon$ (20° C., 1 kHz) | = 10.9 |
| 7 | CGU-3-F | 9.0 | | |
| 8 | CGU-5-F | 8.0 | $\gamma_1$ (20° C.) | = 277 mPa · s |
| 9 | CCGU-3-F | 7.0 | | |

-continued

| Composition Compound | | | Physical Properties | |
|---|---|---|---|---|
| No. | Abbreviation | Conc./% | | |
| 10 | BCH-32 | 10.0 | $k_1$ | = 13.0 pN |
| 11 | CBC-33F | 3.0 | $k_2$ | = 6.0 pN |
| 12 | CBC-53F | 2.0 | $k_3/k_1$ | = 1.01 |
| Σ | | 100.0 | | |
| | | | $V_{10}$ (20° C.) | = 1.14 V |

This mixture has an unfavourably low birefringence.

Example 3

A liquid crystal mixture is realized with the composition and properties given in the following table.

| Composition Compound | | | Physical Properties | |
|---|---|---|---|---|
| No. | Abbreviation | Conc./% | | |
| | | | T (N,I) | = 102° C. |
| | | | T (S,N) | = <−20° C. |
| 1 | GGP-3-CL | 8.0 | | |
| 2 | GGP-5-CL | 20.0 | $n_e$ (20° C., 589.3 nm) | = 1.7152 |
| 3 | PGIGI-3-F | 4.0 | $\Delta n$ (20° C., 589.3 nm) | = 0.2004 |
| 4 | BCH-4F.F.F | 8.0 | | |
| 5 | BCH-5F.F.F | 8.0 | $\epsilon_\parallel$ (20° C., 1 kHz) | = 19.6 |
| 6 | CGU-3-F | 4.0 | $\Delta\epsilon$ (20° C., 1 kHz) | = 14.9 |
| 7 | CGU-5-F | 4.0 | | |
| 8 | CBC-33F | 3.0 | | |
| 9 | CBC-53F | 4.0 | | |
| 10 | CCGU-3-F | 9.0 | $k_1$ | = 14.7 pN |
| 11 | PGU-2-F | 8.0 | $k_3/k_1$ | = 1.03 |
| 12 | PGU-3-F | 8.0 | | |
| 13 | FET-2CL | 6.0 | $V_{10}$ (20° C.) | = 1.05 V |
| 14 | FET-3CL | 6.0 | | |
| Σ | | 100.0 | | |

This mixture has a favourably high value of Δn and a high value of Δε and is very well suited for displays with a low operating voltage.

Example 4

A liquid crystal mixture is realized with the composition and properties given in the following table.

| Composition Compound | | | Physical Properties | |
|---|---|---|---|---|
| No. | Abbreviation | Conc./% | | |
| | | | T (N,I) | = 100° C. |
| | | | T (S,N) | = <−20° C. |
| 1 | GGP-3-CL | 8.0 | | |
| 2 | GGP-5-CL | 18.0 | $n_e$ (20° C., 589.3 nm) | = 1.7155 |
| 3 | PGIGI-3-F | 4.0 | $\Delta n$ (20° C., 589.3 nm) | = 0.2001 |
| 4 | BCH-3F.F | 5.0 | | |
| 5 | BCH-5F.F | 6.0 | $\epsilon_\parallel$ (20° C., 1 kHz) | = 18.5 |
| 6 | BCH-3F.F.F | 9.0 | $\Delta\epsilon$ (20° C., 1 kHz) | = 13.9 |
| 7 | BCH-5F.F.F | 10.0 | | |
| 8 | CBC-33F | 2.0 | | |
| 9 | CBC-53F | 2.0 | | |
| 10 | CGU-3-F | 8.0 | $k_1$ | = 15.3 pN |

-continued

| Composition Compound | | | Physical Properties | |
|---|---|---|---|---|
| No. | Abbreviation | Conc./% | | |
| 11 | PGU-2-F | 7.0 | $k_3/k_1$ | = 1.02 |
| 12 | PGU-3-F | 7.0 | | |
| 13 | FET-2CL | 5.0 | $V_{10}$ (20° C.) | = 1.11 V |
| 14 | FET-3CL | 3.0 | | |
| 15 | FET-5CL | 6.0 | | |
| Σ | | 100.0 | | |

This mixture has a favourably high value of Δn and a high value of Δε and is very well suited for displays with a low operating voltage.

Example 5

A liquid crystal mixture is realized with the composition and properties given in the following table.

| Composition Compound | | | Physical Properties | |
|---|---|---|---|---|
| No. | Abbreviation | Conc./% | | |
| | | | T (N,I) | = 101° C. |
| | | | T (S,N) | = <−20° C. |
| 1 | GGP-3-CL | 8.0 | | |
| 2 | GGP-5-CL | 24.0 | $n_e$ (20° C., 589.3 nm) | = 1.7161 |
| 3 | PGIGI-3-F | 4.0 | $\Delta n$ (20° C., 589.3 nm) | = 0.2000 |
| 4 | BCH-3F.F | 4.0 | | |
| 5 | BCH-5F.F | 3.0 | $\epsilon_\parallel$ (20° C., 1 kHz) | = 17.2 |
| 6 | BCH-3F.F.F | 9.0 | $\Delta\epsilon$ (20° C., 1 kHz) | = 12.6 |
| 7 | BCH-5F.F.F | 9.0 | | |
| 8 | CBC-33F | 4.0 | $\gamma_1$ (20° C.) | = 354 mPa · s |
| 9 | CBC-53F | 4.0 | | |
| 10 | CCG-V-F | 7.0 | $k_1$ | = 14.7 pN |
| 11 | PGU-2-F | 8.0 | $k_3/k_1$ | = 1.09 |
| 12 | PGU-3-F | 8.0 | | |
| 13 | FET-2CL | 4.0 | $V_{10}$ (20° C.) | = 1.14 V |
| 14 | FET-3CL | 4.0 | | |
| Σ | | 100.0 | | |

This mixture has a favourably high value of Δn and a high value of Δε and is very well suited for displays with a low operating voltage.

Example 6

A liquid crystal mixture is realized with the composition and properties given in the following table.

| Composition Compound | | | Physical Properties | |
|---|---|---|---|---|
| No. | Abbreviation | Conc./% | | |
| | | | T (N,I) | = 100° C. |
| | | | T (S,N) | = <−20° C. |
| 1 | GGP-3-CL | 9.0 | | |
| 2 | GGP-5-CL | 24.0 | $n_e$ (20° C., 589.3 nm) | = 1.7162 |
| 3 | PGIGI-3-F | 4.0 | $\Delta n$ (20° C., 589.3 nm) | = 0.2001 |
| 4 | BCH-3F.F | 4.0 | | |
| 5 | BCH-5F.F | 5.0 | $\epsilon_\parallel$ (20° C., 1 kHz) | = 16.9 |
| 6 | BCH-3F.F.F | 9.0 | $\Delta\epsilon$ (20° C., 1 kHz) | = 12.3 |
| 7 | BCH-5F.F.F | 10.0 | | |

-continued

| No. | Composition Compound Abbreviation | Conc./% | Physical Properties | |
|---|---|---|---|---|
| 8 | CBC-33F | 3.0 | γ₁ (20° C.) | = 327 mPa · s |
| 9 | CBC-53F | 4.0 | | |
| 10 | CCG-V-F | 6.0 | k₁ | = 14.5 pN |
| 11 | PGU-2-F | 6.0 | k₃/k₁ | = 1.05 |
| 12 | PGU-3-F | 7.0 | | |
| 13 | FET-2CL | 5.0 | V₁₀ (20° C.) | = 1.15 V |
| 14 | FET-3CL | 4.0 | | |
| Σ | | 100.0 | | |

This mixture has a favourably high value of Δn and a high value of Δε and is very well suited for displays with a low operating voltage.

Example 7

A liquid crystal mixture is realized with the composition and properties given in the following table.

| No. | Composition Compound Abbreviation | Conc./% | Physical Properties | |
|---|---|---|---|---|
| | | | T (N,I) | = 101° C. |
| | | | T (S,N) | = <−20° C. |
| 1 | GGP-5-CL | 16.0 | | |
| 2 | PGIGI-3-F | 7.0 | nₑ (20° C., 589.3 nm) | = 1.7219 |
| 3 | BCH-3F.F | 7.0 | Δn (20° C., 589.3 nm) | = 0.2023 |
| 4 | BCH-5F.F | 7.0 | | |
| 5 | CCP-V-1 | 11.0 | ε∥ (20° C., 1 kHz) | = 16.1 |
| 6 | CBC-33F | 3.0 | Δε (20° C., 1 kHz) | = 11.6 |
| 7 | CBC-53F | 3.0 | | |
| 8 | CCG-V-F | 3.0 | γ₁ (20° C.) | = 277 mPa · s |
| 9 | PGU-3-CL | 6.0 | | |
| 10 | PGU-2-F | 11.0 | | |
| 11 | PGU-3-F | 11.0 | | |
| 12 | FET-2CL | 10.0 | | |
| 13 | FET-3CL | 5.0 | | |
| Σ | | 100.0 | | |

This mixture has a favourably high value of Δn and a high value of Δε and is very well suited for displays with a low operating voltage.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium comprising:
   a dielectrically positive component, component A, containing dielectrically positive compounds, comprising one or more compounds of formula I and one or more compounds of formula II

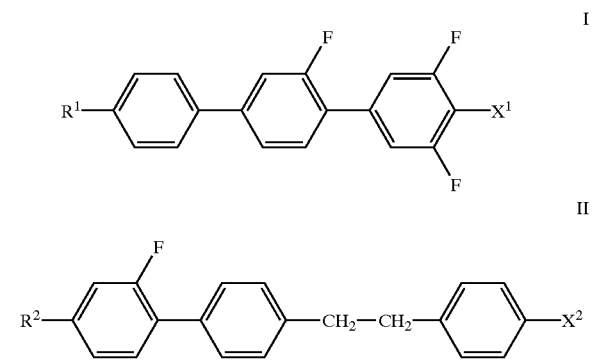

wherein
   $R^1$ and $R^2$, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and
   $X^1$ and $X^2$, independently of each other, are F, Cl, fluorinated alkyl having 1 to 4 C-atoms, or fluorinated alkoxy having 1 to 4 C-atoms,
   wherein, optionally, two of the 6-membered rings in formula I may be linked by a group selected from —CH₂—CH₂—, —CF₂, CF₂—, —CF₂—O—, —O—CF₂— and —CO—O—; and
   a dielectrically neutral component, component B containing dielectrically neutral compounds, comprising one or more compounds of formula IVb

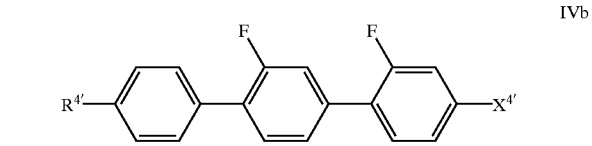

wherein
   $R^{4'}$ is alkyl having 1 to 7 C-atoms, alkoxy having 1 to 7 C-atoms, fluorinated akyl having 1 to 7 C-atoms, fluorinated alkoxy having 1 to 7 C-atoms, alkenyl having 2 to 7 C-atoms, alkenyloxy having 2 to 7 C-atoms, alkoxyalkyl, having 2 to 7 C-atoms, or fluorinated alkenyl having 2 to 7 C-atoms, and
   $X^{4'}$ is or F or Cl,
   wherein, optionally, two of the 6-membered rings in formula IVb may be linked by a group selected from —CH₂—CH₂—, —CF₂—CF₂—, —CF₂—O—, —O—CF₂— and —CO—O—.

2. A liquid crystal medium according to claim 1, wherein component A further comprises one or more compounds selected from the group of compounds of formulae III, IVa, and V

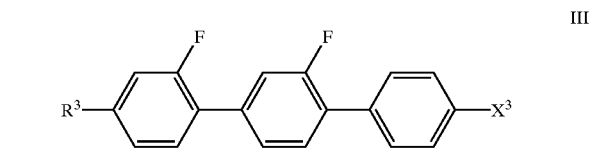

-continued

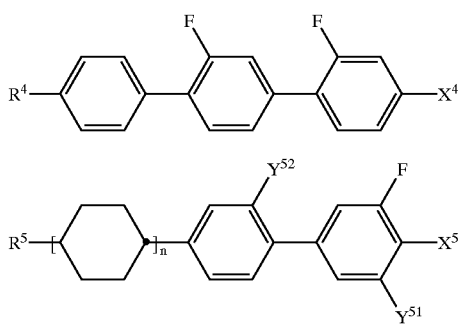

wherein

R³, R⁴ and R⁵, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms, or fluorinated alkenyl having 2 to 7 C-atoms, X³ and X⁵, independently of each other, are F, Cl, fluorinated alkyl having 1 to 4 C-atoms, or fluorinated alkoxy having 1 to 4 C-atoms, X⁴ is fluorinated alkyl or fluorinated alkoxy, each with 1 to 4 C-atoms, Y⁵¹ and Y⁵² are, independently of each other, H or F, and n is 0, 1 or 2, wherein, optionally, two of the 6-membered rings in formulae III to V may be linked by a group selected from —CH₂—CH₂—, CF₂—CF₂—, CF₂—O—, —O—CF₂— and —CO—O.

3. A liquid crystal medium according to claim 1, wherein dielectrically neutral component B comprises one or more compounds of formula VII

wherein

R⁷¹ and R⁷², independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and

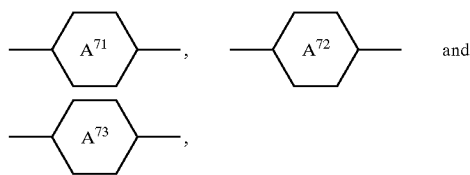

independently of each other, and in case

is present twice, also these, independently of each other, are

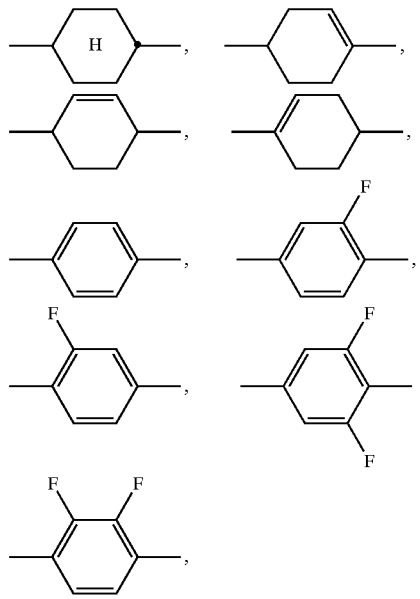

Z⁷¹ and Z⁷² are, independently of each other, and in case Z⁷¹ is present twice, also these independently of each other, —CH₂CH₂—, —COO—, trans-CH=CH—, trans—CF=CF—, —CH₂O—, —CF₂O— or a single bond, and k is 0, 1 or 2.

4. A liquid crystal medium according to claim 2, wherein dielectrically neutral component B comprises one or more compounds of formula VII

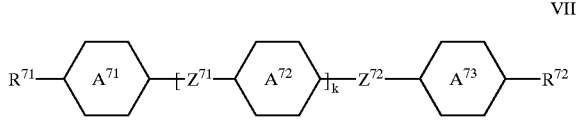

wherein

R⁷¹ and R⁷², independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and

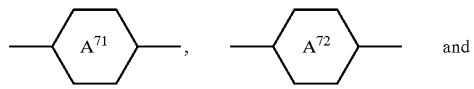

independently of each other, and in case

is present twice, also these, independently of each other, are

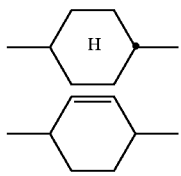

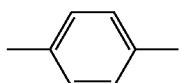

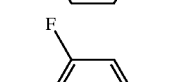

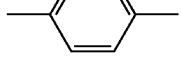

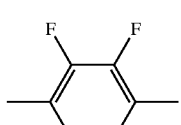

$Z^{71}$ and $Z^{72}$ are, independently of each other, and in case $Z^{71}$ is present twice, also these independently of each other, —CH$_2$CH$_2$—, —COO—, trans-CH=CH—, trans—CF=CF—, —CH$_2$O—, —CF$_2$O— or a single bond, and k is 0, 1 or 2.

5. A liquid crystal medium according to claim 1, further comprising a dielectrically negatice component C comprising one or more compounds of formula VIII

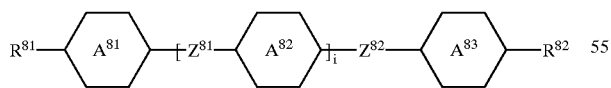

VIII wherein $R^{81}$ and $R^{82}$, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and

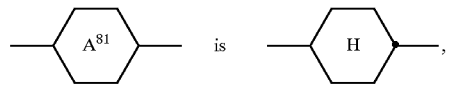

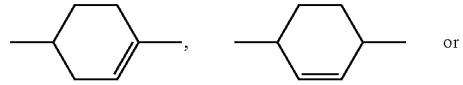

one of

and 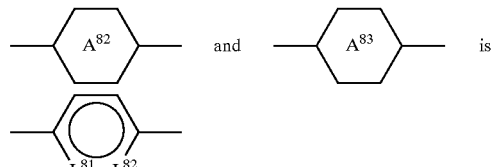

and the other one has the the same meaning, or the meaning given for

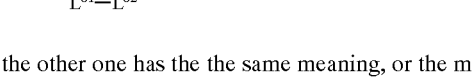

or is

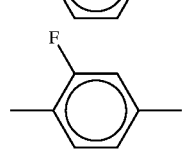

$L^{81}$ and $L^{82}$ are, independently of each other, =C(—F)— or =N—, $Z^{81}$ and $Z^{82}$ are, independently of each other, —CH$_2$CH$_2$—, —COO—, trans-CH=CH—, trans—CF=CF—, —CH$_2$O—, —CF$_2$O— or a single bond, i is 0 or 1.

6. A liquid crystal medium according to claim 2, further comprising a dielectrically negatice component C comprising one or more compounds of formula VIII

VIII wherein $R^{81}$ and $R^{82}$, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7

C-atoms, and

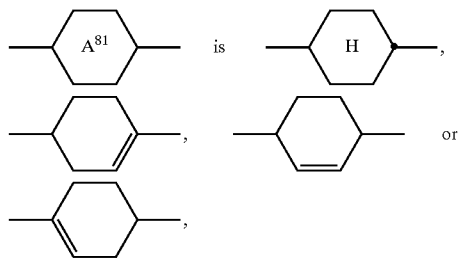

one of

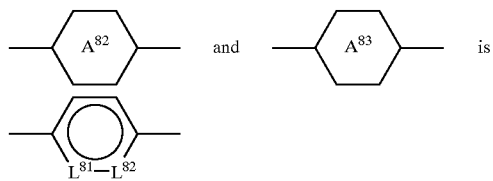

and the other one has the the same meaning, or the meaning given for

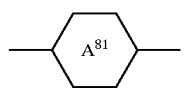

or is

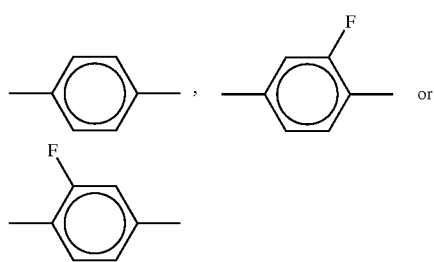

$L^{81}$ and $L^{82}$ are, independently of each other, $=C(-F)-$ or $=N-$,
$Z^{81}$ and $Z^{82}$ are, independently of each other, $-CH_2CH_2-$, $-COO-$, trans-$CH=CH-$, trans-$CF=CF-$, $-CH_2O-$, $-CF_2O-$ or a single bond,
i is 0 or 1.

7. A liquid crystal medium according to claim 3, further comprising a dielectrically negatice component C comprising one or more compounds of formula VIII

VIII

wherein
$R^{81}$ and $R^{82}$, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and

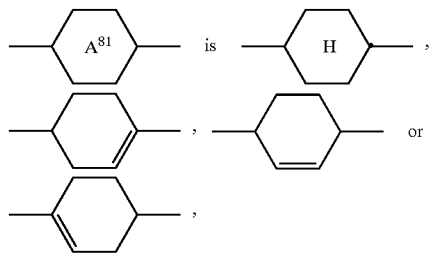

one of

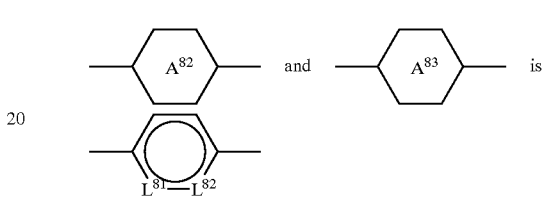

and the other one has the the same meaning, or the meaning given for

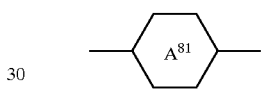

or is

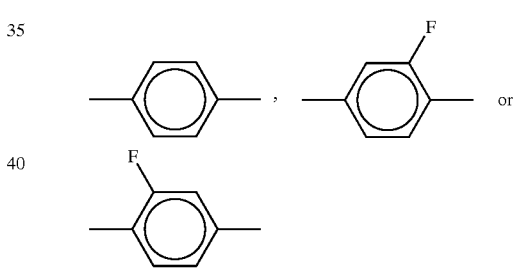

$L^{81}$ and $L^{82}$ are, independently of each other, $=C(-F)-$ or $=N-$,
$Z^{81}$ and $Z^{82}$ are, independently of each other, $-CH_2CH_2-$, $-COO-$, trans-$CH=CH-$, trans-$CF=CF-$, $-CH_2O-$, $-CF_2O-$ or a single bond,
i is 0 or 1.

8. A liquid crystal medium according to claim 4, further comprising a dielectrically negatice component C comprising one or more compounds of formula VIII

VIII

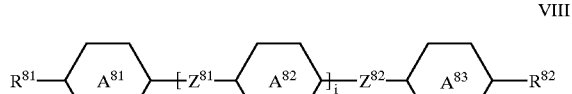

wherein
$R^{81}$ and $R^{82}$, independently of each other, are alkyl having 1 to 7 C-atoms, alkoxy having 1 to 7 C-atoms, fluorinated alkyl having 1 to 7 C-atoms, fluorinated alkoxy having 1 to 7 C-atoms, alkenyl having 2 to 7 C-atoms, alkenyloxy having 2 to 7 C-atoms, alkoxyalkyl having 2 to 7 C-atoms or fluorinated alkenyl having 2 to 7 C-atoms, and

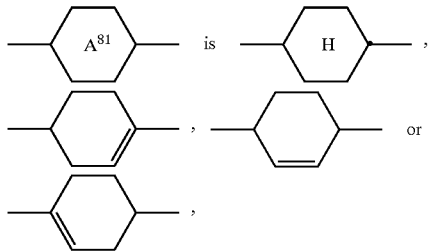

one of

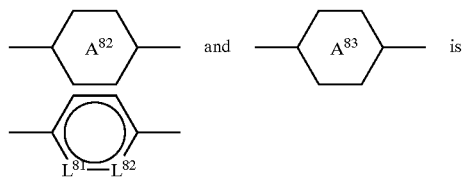

and the other one has the the same meaning, or the meaning given for

or is

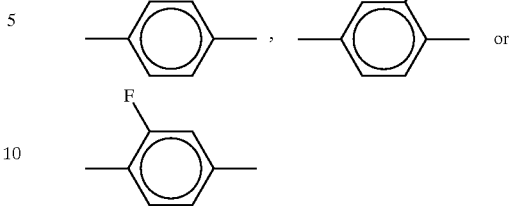

$L^{81}$ and $L^{82}$ are, independently of each other, =C(—F)— or =N—, $Z^{81}$ and $Z^{82}$ are, independently of each other, —CH$_2$CH$_2$—, —COO—, trans-CH=CH—, trans-CF=CF—, —CH$_2$O—, —CF$_2$O— or a single bond, i is 0 or 1.

9. A liquid crystal medium according to claim 1, wherein said medium comprises one or more compounds of formula I in which $X^1$ is F.

10. A liquid crystal medium according to claim 1, wherein said medium comprises one or more compounds of formula II in which $X^2$ is Cl.

11. In a liquid crystal display containing a liquid crystal medium, the improvement wherein said medium is a liquid crystal medium according to claim 1.

12. A liquid crystal display according to claim 11, wherein said medium is addressed by an active matrix.

13. In a method of generating an electro-optical effect using a liquid crystal display, the improvement wherein said liquid crystal display is according to claim 12.

* * * * *